Figure 1:
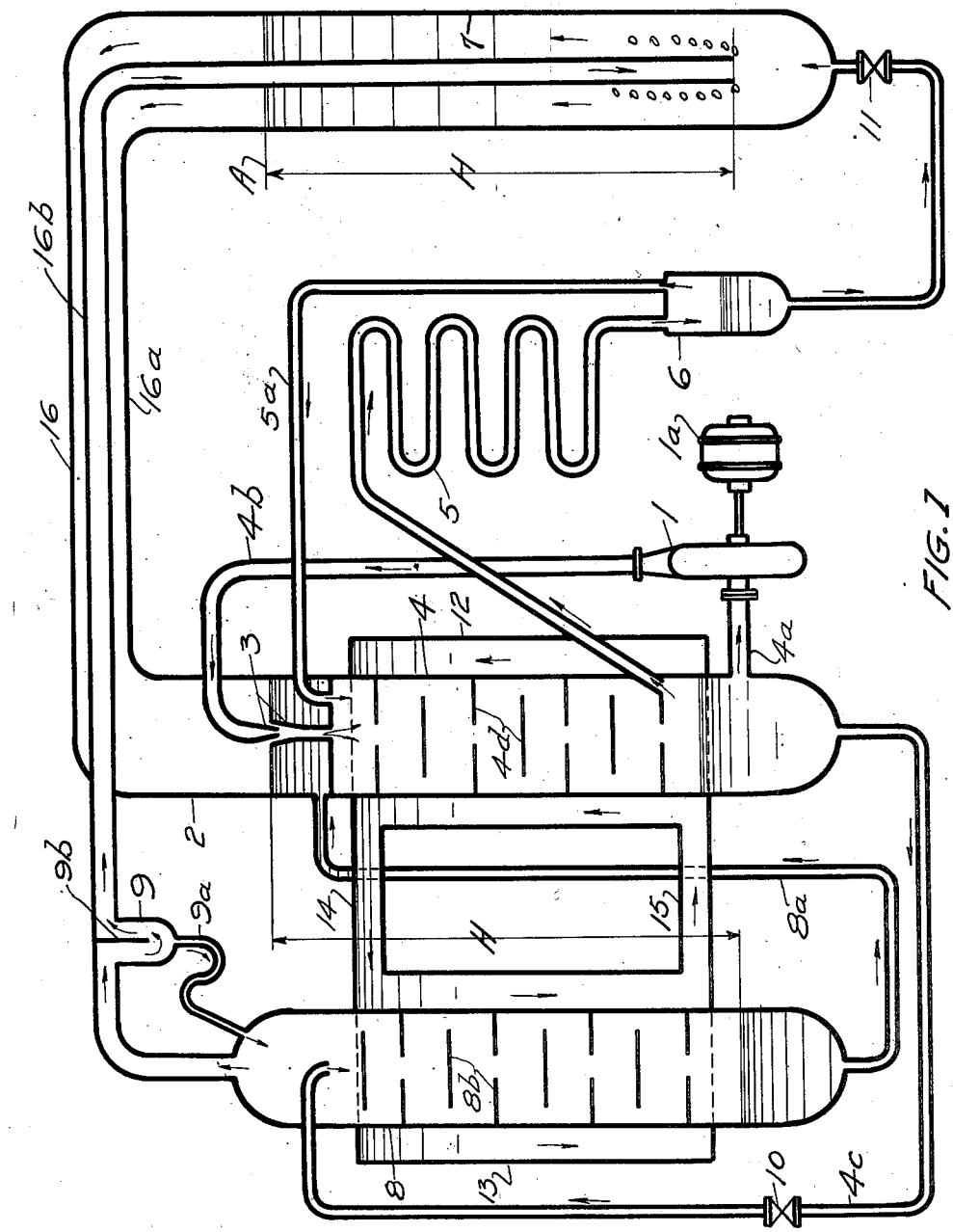

Oct. 11, 1932.  B. F. RANDEL  1,882,254
MEANS AND METHOD OF REFRIGERATION
Filed Feb. 5, 1931

Inventor
Bo Folke Randel

Patented Oct. 11, 1932

1,882,254

UNITED STATES PATENT OFFICE

BO FOLKE RANDEL, OF SAN DIEGO, CALIFORNIA

MEANS AND METHOD OF REFRIGERATION

Application filed February 5, 1931. Serial No. 513,583.

My invention relates to means and method of refrigeration and is supplementary to my application No. 405673, filed November 8, 1929, on method of refrigeration. The object is to device a suitable means to carry out the method as claimed in above application No. 405673 and to further improve the method as claimed in above application No. 405673.

In the accompanying drawing, Fig. 1 illustrates in diagrammatic form a suitable apparatus to carry out my method. The different parts of my apparatus are conventional and may be constructed in many ways to accomplish the same result. Such parts as absorber, evaporator, condenser, receiver, cooling coils, pressure reducing valves, pump, etc., are well known in the arts and I include in my invention any and all constructions and combinations as will accomplish the purpose of my method.

In the diagram, I have selected a conventional liquid jet pump to cause circulation of the mediums. Any other means, suitable to cause motion of the mediums by mechanical action, may be used, and I include any and all constructions and arrangements wherein the circulation is caused in a mechanical manner, or by a moving mechanism.

The principal parts of my apparatus are as follows:—circulating pump 1, suction chamber 2, jet producing nozzles 3, absorber 4, condenser 5, receiver for liquefied refrigerating medium 6, evaporator 7, generator 8, separator 9, pressure reducing valves 10 and 11.

Circulating pump 1 is driven by motor 1a. Pump receives liquid from absorber 4 through pipe 4a, and discharges through pipe 4b and jet producing nozzles 3 back into absorber 4.

Assume that mediums used are: water as liquid medium, ammonia as supplementary gaseous medium, and hexane as refrigerating medium.

It is seen that through the action of pump and jet a pressure differential will be created. Vapors present in suction chamber and in parts connected with this chamber will be pulled down into absorber, accumulating in this absorber with a resultant increase in pressure. The two pressure reducing valves separating the apparatus into two zones will be set so as to maintain a predetermined pressure differential in these two zones. High pressure zone includes absorber 4, condenser 5, receiver 6, and pipe connections up to pressure reducing valves 10 and 11. Low pressure zone includes evaporator 7. There will also be formed an intermediate pressure zone as shown by column H including generator 8, separator 9 and pipe connections up to low pressure discharge ends of pressure reducing valves 10 and 11.

Assume now that vapors in suction chamber 2 and above liquid surface A in evaporator are composed of a mixture of ammonia and hexane and that the liquid in absorber is water. As soon as the vapor mixture is brought into contact with the water, the ammonia will be absorbed, forming a solution of a concentration depending upon pressure and temperature maintained. As the ammonia is absorbed, the hexane vapor will accumulate and increase in pressure.

In absorbing ammonia, heat is generated. The temperature is increased and is adjusted so as to retain the hexane in vapor form in absorber.

A mixture of ammonia vapor and hexane will fill condenser 5 which is cooled sufficiently to condense the hexane vapor to liquid state, hexane liquid collecting in receiver 6. Ammonia vapor accompanying hexane vapor into condenser will continue through circulating return pipe 5a back to absorber 4.

Liquid in absorber 4, which will increase in concentration, will be driven through pipe 4c and pressure reducing valve 10 into generator 8. As this generator is under lower pressure, the absorbed ammonia will partially separate from the water, forming a weakened solution in the lower part of same. In separating the ammonia from the water, heat is absorbed, tending to cool the generator. As the function of the generator is to separate the ammonia from the water, the warmer this generator is kept, the better the result attained. This generator may, as illustrated in my application No. 405,673, be heated by one or another means, to accomplish the desired result. Or I may, as illustrated in the accompanying drawing, utilize the heat generated in the absorber to supply the generator.

As seen, the absorber and generator are surrounded by cooling and heating jackets 12 and 13. These jackets are filled with suitable liquid and are interconnected by pipes 14 and 15. When liquid is heated by action of absorption in absorber, a general circulation is created as indicated by arrows, and the heat is carried from absorber over to generator. As the same amount of heat is generated in absorber as is absorbed in generator, a heat balance is attained, and no other cooling or heating will be required. Instead of separate jackets, absorber and generator may be enclosed in the same space, suitable baffles being provided to cause proper circulation of cooling and heating medium.

The weak solution in generator passes through pipe 8a into absorber, there to reabsorb ammonia vapor and reform a rich solution.

The ammonia vapor generated in generator passes through separator 9 into evaporator 7. In separator 9, equipped with baffle plate 9a, any liquid accompanying the vapor will separate and flow back into generator through trapped pipe 9a.

As pressure in generator is kept sufficiently high to overcome liquid column H and cause weak solution to pass over into suction chamber, the vapor pressure will be sufficiently high to overcome similar liquid column H in evaporator, allowing the ammonia vapor to bubble through the liquid in this evaporator. This liquid is liquefied hexane from receiver 6, reduced in pressure through pressure reducing valve 11. The liquid hexane will evaporate and diffuse into the ammonia bubble with absorption of heat and refrigerating action.

The passage 16 between 7 and 4 acts as a heat exchanger; the cool gas mixture passing through 16a from evaporator to suction chamber cooling the warm ammonia vapor in pipe 16b on its passage from generator to evaporator.

Absorber 4 and generator 8 may be fitted with baffle plates 4d and 8b to assist in thoroughly mixing liquid and vapors and hasten the action of absorption and evaporation.

Pressure reducing valve 11 may be replaced by a float operated valve maintaining a constant liquid level A in evaporator 7.

Having thus described my invention, what I claim as new is:—

1. Method of refrigeration comprising evaporating a liquid refrigerating medium by passing a supplementary gaseous medium through a body of said liquid refrigerating medium, separating said supplementary gaseous medium from said evaporated refrigerating medium by absorbing said supplementary gaseous medium into a liquid absorption medium and condensing said refrigerating medium to liquid state, then separating said absorbed supplementary gaseous medium from said liquid absorption medium and again evaporating the liquefied refrigerating medium in the presence of the separated supplementary gaseous medium, circulation of the mediums being caused by mechanical action.

2. Method of refrigeration comprising evaporating a liquid refrigerating medium by passing a supplementary gaseous medium through a body of said liquid refrigerating medium, separating said supplementary gaseous medium from said evaporated refrigerating medium by absorbing said supplementary gaseous medium into a liquid absorption medium and condensing said refrigerating medium to liquid state, then separating said absorbed supplementary gaseous medium from said liquid absorption medium by the application of heat and again evaporating the liquefied refrigerating medium in the presence of the separated supplementary gaseous medium, circulation of the mediums being caused by mechanical action.

3. Method of refrigeration comprising evaporating a liquid refrigerating medium by passing a supplementary gaseous medium through a body of said liquid refrigerating medium, separating said supplementary gaseous medium from said evaporated refrigerating medium by absorbing said supplementary gaseous medium into a liquid absorption medium and condensing said refrigerating medium to liquid state, then separating said absorbed supplementary gaseous medium from said liquid absorption medium by reducing the pressure and again evaporating the liquefied refrigerating medium in the presence of the separated supplementary gaseous medium, circulation of the mediums being caused by mechanical action.

4. Method of refrigeration comprising evaporating a liquid refrigerating medium by passing a supplementary gaseous medium through a body of said liquid refrigerating medium, separating said supplementary gaseous medium from said evaporated refrigerating medium by absorbing said supplementary gaseous medium into a liquid absorption medium and condensing said refrigerating medium to liquid state, then separating said absorbed supplementary gaseous medium from said liquid absorption medium and again evaporating the liquefied refrigerating medium in the presence of the separated supplementary gaseous medium, circulation of the mediums being caused by imparting motion to said liquid absorption medium and utilizing the kinetic energy of said liquid in motion.

5. Method of refrigeration comprising evaporating a liquid refrigerating medium by passing a supplementary gaseous medium through a body of said liquid refrigerating medium, separating said supplementary gaseous medium from said evaporated refrigerating medium by absorbing said supplementary gaseous medium into a liquid absorption medium and condensing said refrigerating medium to liquid state, then separating said absorbed supplementary gaseous medium from said liquid absorption medium by the application of heat and again evaporating the liquefied refrigerating medium in the presence of the separated supplementary gaseous medium, circulation of the mediums being caused by imparting motion to said liquid absorption medium and utilizing the kinetic energy of said liquid in motion.

6. Method of refrigeration comprising evaporating a liquid refrigerating medium by passing a supplementary gaseous medium through a body of said liquid refrigerating medium, separating said supplementary gaseous medium from said evaporated refrigerating medium by absorbing said supplementary gaseous medium into a liquid absorption medium and condensing said refrigerating medium to liquid state, then separating said absorbed supplementary gaseous medium from said liquid absorption medium by reducing the pressure and again evaporating the liquefied refrigerating medium in the presence of the separated supplementary gaseous medium, circulation of the mediums being caused by imparting motion to said liquid absorption medium and utilizing the kinetic energy of said liquid in motion.

7. An apparatus to produce refrigeration comprising an evaporator containing a liquefied refrigerating medium, means to introduce a supplementary gaseous medium into said evaporator causing evaporation of said refrigerating medium, an absorber, communication means between said evaporator and said absorber, means to introduce liquid absorption medium into said absorber for absorbing said supplementary gaseous medium, a condenser, communication means between said absorber and said condenser, cooling means in connection with said condenser to liquefy said refrigerating medium, communication means between said condenser and said evaporator to transfer said liquefied refrigerating medium back to said evaporator, a generator, communication means between said absorber and said generator to transfer said liquid absorption medium with said supplementary gaseous medium in solution from said absorber to said generator, heating means in connection with said generator to cause separation of said absorbed supplementary gaseous medium from said liquid absorption medium, returning said liquid absorption medium to said absorber through said communication means to introduce liquid absorption medium into said absorber and returning said separated supplementary gaseous medium from said generator to said evaporator through first mentioned communication means to introduce a supplementary gaseous medium into said evaporator, and mechanical means connected with the apparatus to cause circulation of the mediums.

8. An apparatus to produce refrigeration comprising an evaporator containing a liquefied refrigerating medium, means to introduce a supplementary gaseous medium into said evaporator causing evaporation of said refrigerating medium, an absorber, communication means between said evaporator and said absorber, means to introduce liquid absorption medium into said absorber for absorbing said supplementary gaseous medium, a condenser, communication means between said absorber and said condenser, cooling means in connection with said condenser to liquefy said refrigerating medium, communication means between said condenser and said evaporator to transfer said liquefied refrigerating medium back to said evaporator, a generator, communication means between said absorber and said generator to transfer said liquid absorption medium with said supplementary gaseous medium in solution from said absorber to said generator, heating means in connection with said generator to cause separation of said absorbed supplementary gaseous medium from said liquid absorption medium, returning said liquid absorption medium to said absorber through said communication means to introduce liquid absorption medium into said absorber and returning said separated supplementary gaseous medium from said generator to said evaporator through first mentioned communication means to introduce a supplementary gaseous medium into said evaporator, and mechanical means to cause motion of said liquid absorption medium, utilizing the energy of said liquid in motion to cause circulation of the mediums through the apparatus.

9. In a refrigerating apparatus employing a cooling agent, a supplementary gaseous agent inert towards said cooling agent, and a liquid agent inert towards said cooling agent but capable of absorbing said supplementary gaseous agent, a generator, an evaporator, an absorber, a condenser, communication means between said generator, evaporator, absorber and condenser and mechanical means to cause circulation of said agents through said apparatus.

10. In a refrigerating apparatus employing a cooling agent, a supplementary gaseous agent inert towards said cooling agent and a liquid agent inert towards said cooling agent but capable of absorbing said supplementary gaseous agent, a generator, an evaporator, an absorber, a condenser, communication means between said generator, evaporator, absorber, and condenser, mechanical pump means to impart motion to said liquid agent and means to utilize said liquid in motion to cause differential of pressures and circulation of the agents through the apparatus.

11. Method of refrigeration comprising passing a supplementary gaseous medium through a body of a liquefied refrigerating medium, evaporating said liquefied refrigerating medium into said supplementary gaseous medium, separating said supplementary gaseous medium from said evaporated refrigerating medium by absorbing same in an absorption medium and condensing the evaporated refrigerating medium back to liquid state, then separating said absorbed supplementary gaseous medium from said absorption medium, bringing said supplementary gaseous medium and said liquefied refrigerating medium back to point of beginning, circulation of the mediums being caused by mechanical action.

12. In a refrigerating apparatus employing a cooling agent, a supplementary gaseous agent, inert towards said cooling agent, and a liquid agent, inert towards said cooling agent, but capable of absorbing said supplementary gaseous agent; a generator, an absorber, cooling means in connection with said absorber and heating means in connection with said generator, connections between said cooling means and said heating means to allow the cooling medium after absorbing the heat of absorption to deliver its heat in the generator, heating means to the medium being heated, an evaporator and a condenser, communication means between said generator, evaporator, absorber and condenser and mechanical means to cause circulation of said agents through said apparatus.

In testimony whereof, I have hereunto set my hand at San Diego, California, this 16th day of September, 1930.

BO FOLKE RANDEL.